March 3, 1964
A. T. CARPENTER ETAL
3,123,495
SEALANTS COMPOSITIONS AND ARTICLE OF
ORGANO-SILICON COMPOUNDS WITH
POLYSULFIDE POLYMER
Filed July 17, 1961
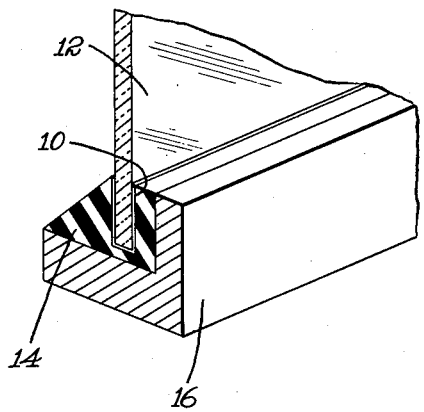
Inventors
Austin T. Carpenter
Colin E. Shilton
By their Attorney

United States Patent Office 3,123,495
Patented Mar. 3, 1964

3,123,495
SEALANTS COMPOSITIONS AND ARTICLE OF ORGANO-SILICON COMPOUNDS WITH POLY-SULFIDE POLYMER
Austin Thomas Carpenter and Colin Ernest Shilton, Leicester, England, assignors, by mesne assignments, to United Shoe Machinery Corporation, Flemington, N.J., a corporation of New Jersey
Filed July 17, 1961, Ser. No. 124,334
Claims priority, application Great Britain July 27, 1960
6 Claims. (Cl. 117—72)

This invention is concerned with improvements in or relating to the sealing of joints.

Sealing compositions that can be applied by one of various means, e.g. hand, trowel or extrusion gun, to gaps between component parts of buildings and aircraft for example, and shaped to conform to the surfaces of the joints, are used in large quantities in the building and engineering industries. Among the sealing compositions available to these industries are compositions that undergo a chemical change after being used to fill a joint such that there results a rubbery seal resistant to oil and gasoline and the weather. One type of sealing composition that undergoes such a chemical change and is at present available is supplied in two parts that are mixed together shortly before use, one of the parts (the bulk of the composition) comprising liquid polysulphide polymer, the other a curing agent for the polymer. Polysulphide polymer does not readily adhere to the wide range of surfaces against which it is desired to bring it into contact for joint sealing purposes. Accordingly, recognizing that it is usually advantageous for the resulting rubbery seal to adhere to adjacent surfaces, it has been proposed to include in the composition some ingredient, for example a liquid resole type of phenol formaldehyde resin, or, as taught in the copending United States application of Austin T. Carpenter, one of the present applicants, Serial No. 860,341, filed December 18, 1959, to include a small amount of an alkyl-substituted phenol dialcohol (e.g. dimethylol-p-cresol), to improve adherence of the seal to a wider variety of surfaces.

It has been observed that, although a sealing composition comprising a liquid polysulphide polymer and an ingredient to improve adherence has been used successfully heretofore to seal joints in many circumstances, it has been found that where the joint is one in which the seal is in contact with a glass surface and the bond therebetween is exposed to sunlight (or ultra-violet light from another source), either by transmission of light through the glass whose opposite side is exposed to the light or by reflection of light from the opposite surface of the glass when the light is at the same side as the seal, adherence of the seal to the glass has broken down in a short time, in some cases in as little as a few days.

Accordingly, it is one of the various objects of the present invention to provide an improved seal in which adherence of a liquid polysulfide polymer sealing composition to a glass surface exposed to ultra-violet light does not rapidly deteriorate. The term "liquid polysulfide" is used herein for brevity to denote a liquid polysulfide polymer having mercaptan terminal and side groups capable of further polymerization and cross linkage.

It has also been observed that when manganese dioxide is used as a curing agent in a sealing composition comprising liquid polysulphide polymer, curing of the polymer is retarded by addition of an ingredient such as has been used heretofore to improve adhesion and even with the addition of such ingredient, adhesion, especially to aluminum alloy has been poor.

It is accordingly another of the various objects of the present invention to provide an improved seal comprising polysulphide polymer cured by manganese dioxide and adherent to aluminum alloy.

To these ends and in accordance with the present invention, there is provided a sealing composition and a seal against a glass surface wherein a silicon-containing organic compound is provided at the interface between the surface of the glass and a sealing composition comprising liquid polysulphide polymer cured to a rubbery condition in contact with the surface.

The drawing is an angular view with parts broken away of a joint seal between a glass surface and a metallic frame.

In one method usable in forming a seal, referred to as the first illustrative method, a silicon-containing organic compound layer 10 (see the drawing) is provided at the interface between a glass surface 12 and a body 14 of sealing composition in the frame 16, the silicon-containing organic compound being applied as a component of a sealing composition comprising liquid polysulphide polymer. In another method of forming a seal against a surface, referred to as the second illustrative method, the surface 12 of the glass may be treated with a dilute solution in water or suitable organic solvent of a silicon-containing organic compound to form the layer 10 and the sealing composition 14 thereafter brought in contact with the surface.

These methods are hereinafter described in detail to illustrate the invention in certain of its aspects by way of example. In carrying out each of these illustrative methods in the manner hereinafter described, there is formed a rubbery, weather resistant, seal which remains adherent to the glass surface even after prolonged exposure of the surface to ultra-violet light.

A method of forming a heat, oil and gasoline-resistant seal which adheres firmly to aluminum alloy wherein there is used a composition comprising liquid polysulphide polymer, a silicon-containing organic compound, an ingredient to improve adhesion, and manganese dioxide is also described in detail hereinafter.

There are hereinafter set out in detail examples of liquid polysulphide polymer compositions (illustrative of the invention in its composition aspects) containing organic-silanes having one or more alkoxy, aryloxy, acyloxy, amino or vinyl groups in them. Organic-silanes having one or more alkoxy groups containing from 1–4 carbon atoms, preferably a methoxy or ethoxy group, or aryloxy groups such as phenoxy or benzoxy groups, or acyloxy groups containing from 1–4 carbon atoms such as acetoxy, formoxy, etc. groups and preferably also containing a vinyl or amino group are found to be especially useful as additives to a liquid polysulphide polymer composition intended to resist the effect of ultra-violet light when used as a weather-resistant seal against a glass surface.

Compositions useful to form a seal comprise mixtures including curing agents. Lead dioxide is preferred as the curing agent, but seals may also be formed using other curing agents, for example manganese dioxide, cumene hydro-peroxide or a substance containing positive chlorine.

A sealing composition in accordance with the invention will usually, as in the case of those used in carrying out the illustrative methods, contain no, or very little, volatile organic solvent (in order that there shall be no, or substantially no, shrinkage of the composition after application to a joint) and will contain inorganic filling material.

The above and other of the various objects and several features of the invention will become more clear from the following description of methods of sealing a joint and of the illustrative compositions aforementioned. It will be realized that these methods and compositions are illustrative of the invention and have been selected for description by way of example and not of limitation thereof.

In carrying out one of the illustrative methods, the two parts A and B of one of the following seven illustrative compositions I, II, III, IV, V, VI and VII are mixed together and the resulting mixture is applied to a joint to be sealed. All parts are given by weight.

*Composition I*

Part A:                                        Parts by weight
    Thiokol LP32 _____ 100
    Barytes _____ 110
    Titanium dioxide _____ 10
    Aluminum powder _____ 5
    Silica _____ 40
    Epok resin J498 _____ 10
    A-172 _____ 4
Part B:
    Lead dioxide _____ 10
    Dibutyl phthalate _____ 9
    Stearic acid _____ 1

Thiokol LP32 is a liquid polysulphide polymer having a molecular weight of 4,000 and prepared by condensing with an alkali polysulphide 99.5 mol percent of bis(2-chlorethyl) formal and 0.5 mol percent trichlorpropane.

The polymer is considered to have a structure corresponding to the formula $$HS-(R-S-S)_{23}-R-SH$$

in which R represents the organic group $$(C_2H_4-O-CH_2-O-C_2H_4)$$

It is a poly functional polymer having reactive mercaptan terminals and side groups so that in the presence of suitable oxidizing agents it polymerizes and crosslinks to a rubbery condition.

Epok J498 is a phenolic resin available from British Resin Products Ltd. and understood to be an aniline modified cresol resole blended with a phenol novolac.

The A-172 is a vinyl alkoxy silane sold by Union Carbide Corporation.

*Composition II*

Part A:                                        Parts by weight
    Thiokol LP32 _____ 100
    Activated calcium carbonate _____ 25
    Titanium dioxide _____ 10
    Stearic acid _____ 1
    A-1100 _____ 2
    Dimethylol p-cresol _____ 0.3
Part B: As for composition I.

The A-1100 used in this composition is gamma amino propyl triethoxy silane, sold by Union Carbide Chemical Co.

*Composition III*

Both parts of this composition are the same as composition II except that in place of the 2 parts of A-1100 in part A are substituted 2 parts of methyl vinyl diacetoxy silane.

*Composition IV*

Part A:                                        Parts by weight
    Thiokol LP32 _____ 100
    Activated calcium carbonate _____ 45
    Titanium dioxide _____ 15
    Stearic acid _____ 1
    Dimethylol p-cresol _____ 0.3
    ESP 2711 _____ 2
Part B: As for composition I.

The organo-silane ESP 2711 used in this composition is a vinyl methoxy silane available from Midland Silicones Ltd.

*Composition V*

Both parts of this composition are the same as composition IV except that in place of the 2 parts of ESP 2711 are substituted 2 parts of phenyl triethoxy silane.

Seals in contact with glass or aluminum obtained in carrying out this illustrative method, whichever of the illustrative compositions is used, set up in a few hours, due to curing of the polysulphide polymer, to a weather-resistant flexible rubbery material strongly adherent to the glass or aluminum surfaces with which it is in contact. Moreover, the bond between the sealing material and glass is resistant especially to deterioration from exposure to sunlight through the glass.

*Composition VI*

Part A:                                        Parts by weight
    Thiokol LP32 _____ 100
    Activated calcium carbonate _____ 40
    Titanium dioxide _____ 10
    Stearic acid _____ 1
    Dimethylol-p-cresol _____ 0.3
    Methyl ethyl ketone _____ 5
    ESP 2712 _____ 4
Part B:
    Lead dioxide _____ 7.5
    Dibutyl phthalate _____ 6.75
    Stearic acid _____ 0.75

Dimethylol-p-cresol is introduced into the mixture in crystalline form. The crystals are conveniently prepared by the room temperature condensation of p-cresol (1 mol) with formalin (2.5 mols) in the presence of 20% sodium hydroxide solution (250 grams); after four days, the crystalline sodium salt is removed by filtration, dried and the free phenol obtained by treatment with acid and recrystallization from ethanol.

ESP 2712 is an amino-functional silane available from Midland Silicones Ltd., and as supplied, is a brown liquid.

ESP 2712 as supplied by the manufacturer is added to part A of the sealing composition, and, after mixing of the parts A and B, the composition is used to seal a joint as referred to hereinbefore. The seal adheres well to the glass and aluminum surfaces, the bond showing resistance to deterioration on exposure to ultra-violet light. It is not essential in carrying out the first illustrative method to include the dimethylol-p-cresol in part A of the composition. Satisfactory adhesion of the seal to the adjacent surfaces of the joint is obtained with the ESP 2712 as the only additive for promoting the adhesion.

*Composition VII*

Part A:                                        Parts by weight
    "Thiokol" LP32 _____ 100
    Activated calcium carbonate _____ 40
    Titanium dioxide _____ 10
    Stearic acid _____ 1
    Dimethylol - p - cresol _____ 0.3
    Methyl ethyl ketone _____ 5
    ESP 2712 _____ 1 to 4
Part B:
    Manganese dioxide _____ 4
    Liquid paraffin _____ 8

An integral fuel tank (for an aircraft) made of aluminum is sealed using the above composition.

A heat, oil and gasoline resistant seal firmly bonded to the adjacent aluminum surfaces of the tank is formed, and it is observed that curing of the polymer takes place more rapidly (viz. in 5 to 12 hours) than is the case if the ESP 2712 is omitted from the composition.

In carrying out an alternative method, also illustrative of the invention, the organic-silanes having additive groups, including those of the respective compositions I, II, III, IV, V and VI and organic-siliconates having similar additive groups, and the alkali metal salts thereof, instead of being included in the composition may be used as dilute solutions in water or in a suitable volatile organic solvent as a primer or wash on the glass, aluminum or other surfaces against which the remainder of the composition is brought in contact to form a seal. The sealing material likewise sets up to a weather-resistant flexible rubbery material showing high resistance, where in contact with glass, to deterioration of the bond thereto on prolonged exposure to sunlight.

In carrying out this alternative method, the areas of the glass and metal elements that will come in contact with the sealing composition are cleaned with solvents to remove grease etc. A solution containing from 1% to 8% of the silane compound is merely wiped on the glass or metal surface and allowed to dry to leave a very thin film (which is not apparent to the eye and does not, therefore, mar the appearance of any surface that may be exposed after sealing the joint, such as with glass).

*Composition VIII*

A treating solution is made up of ESP 2712, 5% in water or methyl isobutyl ketone.

After the treating solution is applied to a glass surface, a sealing composition, as set out in prior examples, but not incorporating the silane compound is used to fill the gap.

*Composition IX*

Alkali-metal vinyl siliconates may be used as a treating solution to provide a coating on a surface such as glass in conjunction with the polysulfide polymer sealing composition. The treating solutions are prepared from alkaline solutions of these compounds which are made acid with hydrochloric, nitric, sulfuric or acetic acid to approximately a pH 4. The solutions are not stable at pH 6–10. Acidification is therefore effected by estimating the quantity of acid and water required by preliminary tests (during which precipitation may occur), and preparing the solution for use by adding the solution as supplied to the estimated amount of dilute acid.

A treating solution is made by addition of acid to an alkaline solution (pH 10.5) of sodium vinyl siliconate. The resulting solution is brought to 1% strength of silicon compound (which may undergo some degree of polymerization as a result of acidification) and to pH 4.

A sealing composition of the following formula is prepared.

| Part A: | Parts by weight |
|---|---|
| "Thiokol" LP32 | 100 |
| Activated calcium carbonate | 40 |
| Titanium dioxide | 10 |
| S.R.F. carbon black | 1 |
| Silica | 20 |
| Stearic acid | 1 |
| Dimethyl - p - cresol | 0.25 |
| Arochlor 1262 | 60 |
| Polyvinyl acetate | 1 |
| Part B: | |
| Lead dioxide | 7.5 |
| Dibutylphthalate | 6.75 |
| Stearic acid | 0.75 |

Arochlor 1262 is a resinous chlorinated polyphenyl obtainable from Monsanto Ltd.

The sodium vinyl siliconate is available under the trade name SS–2DN from Cowles Chemical Co., Cleveland, Ohio.

The glass is primed with the treating solution followed by the sealing composition. The resulting seals set up in a few hours, due to curing of the polysulphide polymer, to a weather-resistant flexible rubbery material strongly adherent to the glass and aluminum surfaces with which it is in contact. Moreover, the bond between the sealing material and the glass is much more resistant to deterioration when exposed to sunlight through the glass than is the case where the glass has not previously been treated with the solution of the silicon-containing organic compound.

By way of example, the following comparative test was carried out on the sealing composition of Composition IX. After mixing parts A and B, samples of the composition where applied as narrow beads ⅜″ x ¼″ to four glass strips 6″ x 1″ all of which had been cleaned and two of which had also been wiped with the treating solution. After seven days, these test pieces were submitted to accelerated weathering using an apparatus comprising an arc lamp and water spray in accordance with the Standard Method of Testing set out in the Ministry of Defense Specification DEF–1053 Method No. 26. The apparatus was run in a cycle of one week wet using the arc lamp and continuous spray and one week dry with the arc lamp only. Two test pieces (one with the treated and one with the untreated glass) were tested with the clear glass side facing the arc lamp; the other two with the side carrying the sealing composition facing the lamp. It will be appreciated that, as in many building applications, the bond in the latter case is subjected to light reflected from the opposite surface of the glass. In the cases where the plain glass faced the lamp, adhesion between the sealing composition and the untreated glass was lost in less than 300 hours, while the test piece with the treated glass still showed good adhesion after 1,000 hours. In the other cases adhesion was lost on the untreated glass after 500 hours while on the treated glass there was no sign of failure after 2,000 hours.

Having thus described our invention what we claim as new and desire to protect by Letters Patent of the United States is:

1. A sealant composition comprising a curable liquid polyfunctional polysulfide polymer having reactive mercaptan groups, from 1% to 8% by weight based on the weight of the polysulfide polymer of an organic-silane compound, and a curing agent for the polysulfide polymer.

2. A sealant composition comprising a curable liquid polyfunctional polysulfide polymer having reactive mercaptan groups, from 1% to 8% by weight based on the weight of the polysulfide polymer of an organic-silane compound containing as a substituent an alkoxy group having from 1 to 4 carbon atoms, and a curing agent for the polysulfide polymer.

3. A sealant composition comprising a curable liquid polyfunctional polysulfide polymer having reactive mercaptan groups, from 1% to 8% by weight based on the weight of the polysulfide polymer of an organic-silane compound containing as a substituent an acyloxy group having from 1 to 4 carbon atoms, and a curing agent for the polysulfide polymer.

4. A sealant composition comprising a curable liquid polyfunctional polysulfide polymer having reactive mercaptan groups, from 1% to 8% by weight based on the weight of the polysulfide polymer of an organic-silane compound containing as a substituent a vinyl group, and a curing agent for the polysulfide polymer.

5. A sealant composition comprising a curable liquid polyfunctional polysulfide polymer having reactive mercaptan groups, from 1% to 8% by weight based on the weight of the polysulfide polymer of an organic silane compound containing as a substituent an amino group, and a curing agent for the polysulfide polymer.

6. As an article of manufacture a structure having a glass surface, a body of rubbery polysulfide polymer cured in situ against and bonded to said surface and a silicon-containing organic compound at least at the interface between the surface of said structure and said body of polysulfide polymer, the bond between said surface and said cured polymer body being strong and resistant to deterioration by ultra-violet light, said silicon-containing organic compound comprising at least one member of the class consisting of organic-silanes and organic-siliconates, said organic silanes having at least one substituent from the group consisting of alkoxy groups having from 1 to 4 carbon atoms, acyloxy groups having from 1 to 4 carbon atoms, vinyl groups and amino groups, and said organic siliconate being an alkali metal vinyl siliconate.

References Cited in the file of this patent

UNITED STATES PATENTS

| | | |
|---|---|---|
| 2,465,513 | Carasso | Mar. 29, 1949 |
| 2,557,778 | Barry | June 19, 1951 |
| 2,979,420 | Harper | Apr. 11, 1961 |
| 3,024,131 | Hutchinson | Mar. 6, 1962 |
| 3,032,439 | Muller et al. | May 1, 1962 |

FOREIGN PATENTS

| | | |
|---|---|---|
| 872,929 | Great Britain | July 12, 1961 |

OTHER REFERENCES

Nasiak et al.: J. Org. Chem., vol. 24 (1959), pages 492–496.